United States Patent [19]

Hartman et al.

[11] 4,064,217
[45] Dec. 20, 1977

[54] PROCESS FOR RECOVERING ALUMINUM FROM ALUNITE ORE

[76] Inventors: George J. Hartman, 4959 Allison St., Arvada, Colo. 80002; Michael G. Darland, 645 Estes, Lakewood, Colo. 80215

[21] Appl. No.: 728,215

[22] Filed: Sept. 30, 1976

[51] Int. Cl.$^2$ .............................................. C01F 7/06
[52] U.S. Cl. .................................... 423/120; 423/127; 423/128; 423/131; 423/199
[58] Field of Search ............... 423/120, 127, 128, 131, 423/199

[56] References Cited

U.S. PATENT DOCUMENTS

| | | | |
|---|---|---|---|
| 3,890,425 | 6/1975 | Stevens et al. | 423/120 |
| 3,890,426 | 6/1975 | Stevens et al. | 423/120 |
| 3,983,211 | 9/1976 | Nasyrov et al. | 423/128 |
| 3,984,521 | 10/1976 | Nasyrov et al. | 423/120 |
| 3,996,334 | 12/1976 | Hartman et al. | 423/199 |

Primary Examiner—Herbert T. Carter

[57] ABSTRACT

An improvement in the process for recovering aluminum from alunite ore disclosed in U.S. Pat. Nos. 3,890,425 and 3,890,426, the improvement being in the recovery of potassium sulfate by crystallization from the leaching solution resulting from potassium hydroxide leaching of the roasted ore, the improvement consisting of adding potassium hydroxide to the concentrated leach liquor prior to crystallization to increase the concentration of the potassium ion so that increased recoveries of potassium sulfate are obtained at a given temperature over those obtained when this procedure is not used. By this procedure a yield is obtained at a temperature below that which is required to obtain the same yield when potassium hydroxide is not used so that the high temperatures formerly necessary to hold enough potassium sulfate in solution for an economic crystallization are avoided. The improvement is particularly adapted to the process of the patents using potassium hydroxide as the leaching agent and in which the mother liquor is recycled to the leach as potassium hydroxide in an amount up to that required for the leaching step can be added in the crystallization step so that the potassium hydroxide serves both as a crystallization aid and as a leachant.

7 Claims, 1 Drawing Figure

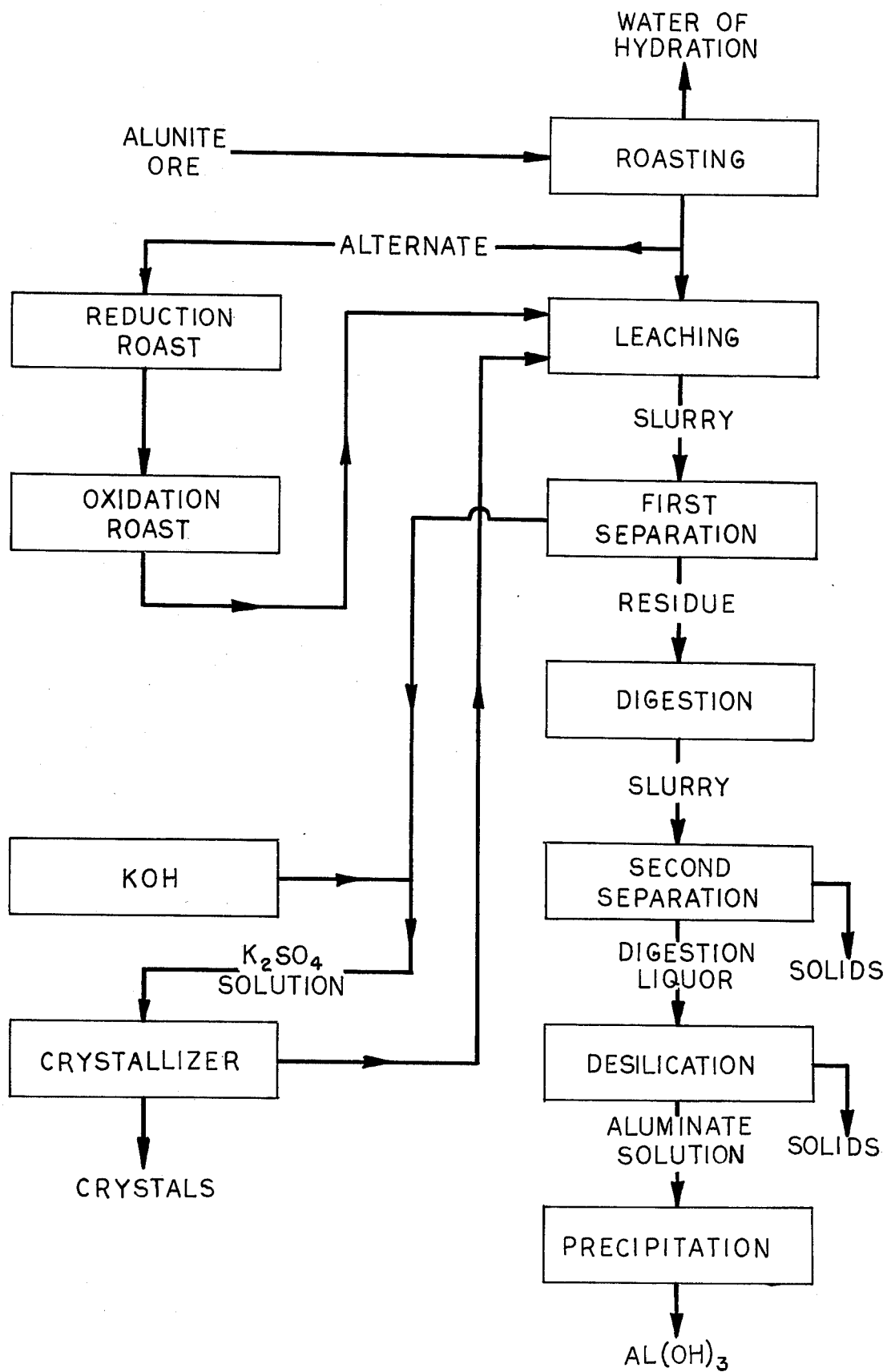

PROCESS FOR RECOVERING ALUMINUM FROM ALUNITE ORE

CROSS-REFERENCES TO RELATED APPLICATIONS

The present invention is an improvement in the basic process for recovering aluminum from alunite ore disclosed in U.S. Pat. Nos. 3,890,425 and 3,890,426, assigned to a common assignee with this application. The combined processes of these two patents are referred to hereinafter as "the basic process."

BACKGROUND OF THE INVENTION

The invention lies in the field of processes for the recovery of aluminum from its ores using crystallization procedures.

The present invention is an improvement in the process disclosed in the above-referenced patents, this latter process including the following process steps as illustrated in the flow diagrams of the referenced patents.

1. roasting particulate alunite concentrate to remove water of hydration;
2. removing sulfur compounds and alkali metal compounds, including potassium sulfate, from the roasted ore, either by the procedure of U.S. Pat. No. 3,890,425 in which the roasted ore is subjected to a reducing roast, and then to an oxidizing roast followed by leaching with a solvent, such as water or an alkaline solution, or by the process of U.S. Pat. No. 3,890,426 in which the roasted ore is leached in a solvent, such as ammonium hydroxide or other alkaline solution;
3. recovering potassium sulfate from the leach liquor of step (2) by heating the leach liquor to elevated temperatures to permit economic crystallization followed by crystallization as disclosed in U.S. Pat. No. 3,890,426;
4. digesting the residue from the leaching step with caustic solution to convert aluminum values in the residue to soluble aluminates;
5. precipitating silica from the resulting solution of step (4) to leave a solution of aluminates and a residue known as a "desilication product" consisting essentially of sodium aluminum silicate, along with other impurities;
6. precipitating aluminum values from the solution of step (5); and
7. recovering product aluminum from the aluminum values of step (6).

Both of the alternatives of step (2) above are included in the expression used herein "roasting and leaching to remove water and compounds of sulfur and alkali metals."

The sales price of a commercial grade metal recovered from an ore is dependent upon economic factors related to the process for recovering the metal from its ores. Elimination of steps, converting the process to a continuous process, elimination of reagents, use of lower temperatures, etc., are examples of expedients which reduce the expense of the process, and therefore reduce the expense of recovering the metal. In the present invention, the improvement in the process lies in a procedure by which potassium sulface can be economically crystallized from the potassium sulfate liquor with the use of lower temperatures so that a saving in the heat required is achieved, or conversely, more $K_2SO_4$ is recovered at the same temperature with the result that more $k_2SO_4$ is recovered with the same amount of heat.

In the procedure as disclosed in the above-referenced patents, the efficiency of the potassium sulfate crystallization from the leach liquor is limited by the chemical solubility constraint of potassium sulfate. In order for the crystallization to be efficient, the concentration of potassium sulfate in the leach liquor must be very high and this can only be achieved by the use of high temperatures to, in effect, produce a super-saturated solution. In view of the large amount of leach liquor which must be processed in the production process of recovering aluminum from alunite ore, the required heat is a significant expense item in the process.

Accordingly, it is a principal objective of this invention to provide an improvement in the procedure for recovering potassium sulfate from the leach liquor of the basic process in which the heat required for the crystallization step is significantly reduced.

SUMMARY OF THE INVENTION

The invention comprises the addition of potassium hydroxide to the potassium sulfate leach liquor prior to crystallization to precipitate out additional amounts of potassium sulfate so that an amount of potassium sulfate is recovered by crystallization from the mother liquor which is equivalent to that formerly recovered at higher temperatures. A modification is the addition to the potassium sulfate leach liquor prior to crystallization of the amount of potassium hydroxide required for the leaching step.

BRIEF DESCRIPTION OF THE DRAWING

The drawing is a schematic flow sheet of the process of the invention showing the basic process of the referenced patents modified by the inclusion therein of the improved crystallization procedure of the present invention.

DESCRIPTION OF THE PREFERRED EMBODIMENT

Referring to the flow diagram of the drawing illustrating the present invention, it will be seen that the pregnant leach liquor containing dissolved potassium sulfate resulting from the leach step, after separation from the residue is sent to the crystallizer unit for crystallization, and after crystallization, the mother liquor is returned to the potassium hydroxide leaching of the roasted ore. The residue from the leaching step is sent to the Bayer digestion to convert the aluminum values to soluble aluminates from which aluminum hydroxide is recovered by precipitation.

As shown, potassium hydroxide is added to the potassium sulfate leach liquor prior to the crystallization step. In accordance with the former procedure, it was necessary to heat the potassium sulfate liquor to high temperatures in order to form a solution of a sufficiently high concentration to permit economic crystallization of potassium sulfate from the solution. This is because of the chemical solubility constraint of potassium sulfate. In the current pilot plant operation, the pregnant solution of leach liquor is controlled by heating at approximately 170 g/l $K_2SO_4$. This liquor, after crystallization, contains approximately 130 g/l of $K_2SO_4$ so that approximately 40 g/l yield per cycle is obtained. It is, of course, in the interest of economics to increase the yield per cycle at the same temperature or to obtain the same yield per cycle at a lower temperature.

It has been found that by controlled addition of the proper quantity of concentrated potassium hydroxide to the pregnant solution just prior to crystallization the yield can be increased from approximately 40 g/l/cycle up to about 60 g/l/cycle at the same temperature so that a 20-35% increase in the recovery is obtained and this is achieved at the same temperature used in the former process. Conversely, the same amount of potassium sulfate can be recovered at a lower concentration at a lower temperature as was recovered in the former process at a higher concentration at a higher temperature. The saving in heat required to recover the same amount of potassium sulfate is significant.

A further advantage of the improvement is that potassium hydroxide can be added to the potassium sulfate leach liquor prior to crystallization in an amount up to that required for leaching the roasted ore, the preferred amount being at least 90% of that required for leaching. An excess of potassium hydroxide in the crystallization step has no adverse effects, and this reagent is the preferred one for leaching the calcined ore; however, for economic reasons, it is preferred that the amount of potassium hydroxide added to the crystallization step not exceed that required for the leaching step. Potassium hydroxide is particularly effective as the agent for increasing the potassium ion concentration of the potassium sulfate liquor as it is more soluble than potassium sulfate, and will not crystallize out so long as there is potassium sulfate in the liquor. Obviously, use of another soluble potassium compound with a different anion would not be feasible as it would result in another impurity being added for subsequent removal and would contaminate the recovered potassium sulfate.

The invention is illustrated by the following example, which is not limiting thereof.

EXAMPLE 1

A 190 g/l $K_2SO_4$ stock solution was made up at 70° C and allowed to equilibrate for approximately 1 hour. An analysis was made for ($SO_4^=$). Two 250 ml. portions were drawn off and allowed to cool to room temperature of 26° C. To one 250 ml. portion, 5.3 ml. of 45% KOH was added, this concentration being equivalent to that required for the leaching step under plant operating conditions. The other sample was untreated. After crystallization, analyses for $SO_4^=$ were run to determine the potassium sulfate concentrations in each of the samples following crystallization, these concentrations reflecting the amount of $K_2SO_4$ crystallized. The results are recorded in the following Table One.

Table One

| Sample | | $K_2SO_4$ concentration (g/l) after crystallization |
|---|---|---|
| 1. | Initial solution | 190 |
| 2. | Solution at 26° C, no addition of KOH | 122 |
| 3. | Solution at 26° C with addition of KOH | 110 |

The above results show that an additional 12 grams of potassium sulfate is recovered per cycle by adding potassium hydroxide to the potassium sulfate leach liquor prior to crystallization. Obviously, this would occur at any feasible temperature. The ultimate result is that, irrespective of the temperature used, 20-35% more potassium sulfate is obtained. Accordingly, in order to recover the same amount of potassium sulfate as was obtained formerly without the use of potassium hydroxide from a solution heated to 70° C to provide a high enough concentration for economic crystallization, it would not be necessary to use nearly this much heat using the present invention as use of potassium hydroxide permits the same recovery from a solution of lower concentration of potassium sulfate.

The improved recovery of potassium sulfate resulting from use of potassium hydroxide in the crystallization step was calculated for a pilot plant operation by extrapolation based on the above results. The given plant operating conditions are as follows:

1. 700 lbs. ore/hour
2. 55 lbs. KOH/ton ore required for leaching
3. 4 g/m circulation of $K_2SO_4$ liquor.

Extrapolation based on the results in Table I shows that the additional recovery of potassium sulfate due to potassium hydroxide addition to the crystallization step is 14.9 g/l of $K_2SO_4$ of pregnant solution, a significant improvement in recovery of $K_2SO_4$ per cycle.

The precipitation temperature range for economic recovery of $K_2SO_4$ using potassium hydroxide varies from 34° C to 100° C with a preferred precipitation temperature range being from 34° C to 70° C.

The principal advantage of the invention is that it is peculiarly applicable to the specific aluminum recovery process in which by-product potassium sulfate is produced, as the invention provides an improved procedure by which a significant additional amount of potassium sulfate can be recovered by crystallization at a given temperature so that a saving in heat is accomplished by precipitating at a lower temperature with the same recovery as was formerly possible, or conversely, more $K_2SO_4$ can be recovered at the same temperature with the result that more $K_2SO_4$ is recovered with the same amount of heat. The result in either case is that less heat is required for the $K_2SO_4$ recovered. An additional advantage is that when the preferred leaching agent, potassium hydroxide, is used, an amount of this reagent up to that required for leaching can be added in the crystallization step to perform a double function.

What is claimed is:

1. A process for recovering aluminum values for alunite ore comprising the steps of:
    a. leaching the alunite ore with potassium hydroxide and recovering a liquid portion containing compounds of sulphur and alkali metals, including potassium sulfate and a residue portion containing aluminum values;
    b. adding an effective amount of potassium hydroxide to the liquid portion recovered from step (a) to raise the concentration of potassium ion in said liquid for increasing the recovery of potassium sulfate at a given temperature;
    c. precipitating potassium sulfate from said liquid of step (b) and recovering said potassium sulfate precipitate therefrom;
    d. recycling said liquid from which potassium sulfate has been recovered for use in said leaching step (a); and
    e. treating the residue portion recovered from step (a) and further treating said residue to recover the aluminum values therein.

2. The process of claim 1 in which potassium hydroxide is added to the potassium sulfate liquor prior to crystallization in an amount up to that required for the leaching step so that the added potassium hydroxide serves the double function of a crystallization and a leaching agent.

3. The process of claim 2 in which potassium hydroxide is added in an amount equal to that required for the leaching step.

4. The process of claim 2 in which the potassium hydroxide is added in an amount up to about 90% of that required for the leaching step.

5. The process of claim 1 performed continuously.

6. The process of claim 1 in which the potassium sulfate is crystallized at a temperature between about 34° C and about 100° C.

7. The process of claim 1 in which the potassium sulfate is crystallized at a temperature between about 34° C and about 70° C.

* * * * *